United States Patent [19]
Allen et al.

[11] 3,884,710
[45] May 20, 1975

[54] EXPANSIVE CEMENT

[75] Inventors: Joseph H. Allen, Irving; Waldemar A. Klemm; John P. Luker, both of Dallas, all of Tex.

[73] Assignee: General Portland, Inc., Dallas, Tex.

[22] Filed: Oct. 10, 1973

[21] Appl. No.: 404,934

Related U.S. Application Data

[63] Continuation-in-part of Ser. No. 301,334, Oct. 27, 1972, abandoned.

[52] U.S. Cl. .................. 106/89; 106/100; 106/118
[51] Int. Cl. .......................... C04b 7/04; C04b 7/34
[58] Field of Search ...................... 106/89, 100, 118

[56] References Cited
UNITED STATES PATENTS

| | | | |
|---|---|---|---|
| 1,700,032 | 1/1929 | Durbin | 106/100 |
| 1,852,547 | 4/1932 | Whelan | 106/100 |
| 1,963,588 | 6/1934 | Maust | 106/102 |
| 1,966,419 | 7/1934 | Pontoppidan | 106/102 |
| 3,139,351 | 6/1964 | Hammer | 106/89 |
| 3,155,526 | 11/1964 | Klein | 106/89 |
| 3,649,317 | 3/1972 | Houseknecht | 106/90 |
| 3,711,306 | 1/1973 | Kogan et al | 106/100 |
| 3,785,844 | 1/1974 | Kawano | 106/89 |

FOREIGN PATENTS OR APPLICATIONS

| | | | |
|---|---|---|---|
| 345,145 | 3/1931 | United Kingdom | 106/118 |

OTHER PUBLICATIONS

Taylor, H. F. W., The Chemistry of Cements, Vol. I, Academic Press, N.Y., 1964, pp. 100-101.

*Primary Examiner*—Delbert E. Gantz
*Assistant Examiner*—James W. Hellwege
*Attorney, Agent, or Firm*—Richards, Harris & Medlock

[57] ABSTRACT

A novel expansive cement composition is provided which is made of particulate argillaceous and calcareous materials and contains from about 1 to about 70 wt % of free CaO with the remaining portion being primarily tricalcium silicate and containing substantially no dicalcium silicate. The composition is preferably manufactured by subjecting a conventional Portland cement raw mix which has been "overlimed," to hard burning conditions within a Portland cement kiln such that the silicate materials are reacted with lime to form tricalcium silicate but yet leave from about 1 to about 70% of free CaO in the clinker, and thereafter comminuting the clinker. The resulting dry material can be used directly as an expansive cement, or it can be mixed with other cements such as Portland cement to impart expansive qualities thereto.

28 Claims, No Drawings

EXPANSIVE CEMENT

This is a continuation-in-part of copending U.S. Pat. application Ser. No. 301,334, filed Oct. 27, 1972, now abandoned.

This invention relates to expansive cements. In another aspect, this invention relates to a novel expansive cement composition. In still another aspect, this invention relates to a novel method of producing said novel expansive cement composition.

Portland cement is manufactured by mixing together a calcareous material, such as limestone, and an argillaceous material and thereafter grinding the mixture into a fine powder. The fine powder is then passed through a kiln at a temperature of incipient fusion to form a clinker which is then interground with a small amount of gypsum into a fine settable powder.

Basically, the constituents of Portland cement are in the form of calcium silicates, principally tricalcium silicate, ($C_3S$) and dicalcium silicate ($C_2S$) together with lesser quantities of tricalcium aluminate ($C_3A$) and tetracalcium aluminoferrite ($C_4AF$), as well as minor quantities of alkali oxides and magnesia. It is noted, in cement nomenclature, $C = CaO$, $S = SiO_2$, $A = Al_2O_3$, and $F = Fe_2O_3$. Upon mixing with water, the cement hydrates, sets and hardens to thereby serve as a binder for sand, gravel, or other mineral aggregates.

While Portland cement concrete is one of the most widely used construction materials, it possesses the inherent characteristic of shrinkage on drying. This drying shrinkage may cause cracks in the resulting concrete. Cracks of varying sizes can generally be found in most reinforced concrete structures. Because of this inherent drying-shrinkage of Portland cement concretes, various prestressing techniques have been utilized. Prestressing is most conventionally accomplished mechanically, and requires elaborate equipment and techniques. Prestressing places the setting concrete under a restraint and induces a compressive stress of sufficient magnitude to compensate for the shrinkage effect.

Furthermore, efforts have been made to produce a cement composition which will not shrink upon hydration and setting. These efforts have led to the development of expansive cements which are basically cements which when mixed with water form a paste that during and after setting and hardening tends to increase in volume to a degree sufficient to at least compensate for the inherent drying shrinkage.

Expansive cements have been utilized to produce shrinkage-compensating concretes and self-stressing concretes. A shrinkage compensating concrete is an expansive cement concrete in which expansion if restrained, induces compressive stresses which approximately offset tensile stresses in the concrete induced by drying. On the other hand, self stressing concrete is an expansive cement concrete in which expansion, if restrained, induces compressive stresses of a high enough magnitude to result in significant compression in the concrete after drying shrinkage has occurred.

Probably the most well known of the expansive type cements are the so-called "Type K" cement compositions and components such as disclosed in U.S. Pat. Nos. 3,155,526; 3,251,701; and 3,303,037. Generally, these Type K cements include an expansive component which consists of a stable anhydrous calcium sulfoaluminate compound made by heating a mixture of bauxite, chalk, and gypsum at a temperature no higher than about 2,900°F (about 2,400°F).

Another conventional expansive cement is "Type M" cement which is either a mixture of Portland cement, calcium aluminate cement and calcium sulfate, or an interground product made from Portland cement clinker, calcium aluminate clinker and calcium sulfate. Still another conventional expansive cement is "Type S" cement, which is a Portland cement containing a large computed $C_3A$ content and modified by an excess of calcium sulfate above the usual amount found in other Portland cements.

The above-described expansive cement materials are used for producing shrinkage compensating and self-stressing concrete. However, the use of these conventional expansive cement compositions has met with only a limited degree of success, mainly because of the fact that when such cements are utilized, the differential between the induced expansion and the subsequent drying shrinkage is very difficult to control within acceptable parameters.

Generally, with most conventional expansive cement compositions, this differential remains too great and must be offset by the use of relatively large quantities of reinforcing steel, for example. In addition, the conventional expansive cement compositions generally must be subjected to controlled conditions during curing. For example, standard expansive cements generally do not expand well at high temperatures and must be cured under wet conditions before they show acceptable results.

Furthermore, such cements are not sulfate-resistant cements. In addition, the strength of the conventional expansive concretes is usually less than non-expansive cements.

Therefore, one object of this invention is to provide a novel expansive cement composition.

Another object of this invention is to provide a novel method for producing an expansive cement composition.

A further object of this invention is to provide a novel expansive cement composition which does not depend for its effectiveness on a sulfoaluminate-type compound.

Still further objects of this invention are to provide an expansive cement composition which has water requirements no different from ordinary Portland cement, will set at high temperatures, and under dry conditions, and will form a concrete which is as strong or stronger than concrete formed from conventional Portland cements.

According to the invention, we have discovered a novel, expansive cement composition which can be made solely from argillaceous and calcareous materials that are conventionally used in the production of Portland cement clinker. The composition comprises argillaceous and calcareous materials containing from about 1 to about 70% by weight of free (uncombined) lime (calcium oxide), and with the remaining portion of the expansive composition being primarily tricalcium silicate and containing substantially no dicalcium silicate. It is noted that free lime as used in the scope of this invention is meant lime which can be determined by the method of ASTM C114-69. The expansive mechanism of this invention depends on the increase in volume when calcium oxide hydrates to calcium hydroxide.

According to one embodiment of the subject invention, an expansive cement composition is produced by a process which includes introducing argillaceous and calcareous reactant materials to the feed end of a kiln, said reactant materials containing sufficient calcium oxide, or materials which will form said calcium oxide in situ to fully stoichiometrically react with the remaining materials in the kiln, and provide an excess of unreacted calcium oxide in the burned clinker in the range of from about 1 to about 70 wt % thereof; and thereafter burning the reactant materials in a burning zone in the kiln for a sufficient time and temperature to completely react said remaining materials with said calcium oxide in a manner such that all the silicate is present in the form of tricalcium silicate; and thereafter grinding the clinker to produce an expansive cement composition.

According to still another embodiment of this invention, an expansive cement is provided which comprises a mixture of the above-described expansive cement composition and a hydratable cement such as Portland cement.

The novel expansive cement composition of the subject invention can be tailored to suit individual job requirements. For example, the novel composition can be used alone or in admixtuure with Portland cement to produce a shrinkage compensating concrete or a self stressing concrete composition. The effective delayed expansive action of the novel composition will act within the set concrete and will continue for about a week. This expansive quality is totally unexpected when based upon the known deleterious action of excess amounts of free lime in conventional Portland cement composition. Thus, it is known that the presence of free lime in quantities greater than a few percent in Portland cement compositions will render the compositions unsound because the free lime causes delayed disruptive expansion in concrete. This disruptive expansion which is caused by excess amounts of free lime in Portland cement may begin within the first week of hydration and continue for as long as 10 years. Thus, it seems surprising that whereas the presence of excess free lime within ordinary Portland cement will result in uncontrolled expansion and disintegration of Portland cement concrete, the presence of free lime within the expansive component of the subject invention results in very beneficial, controlled expansion when incorporated in all types of Portland cements or pozzolanic cements.

In ordinary Portland cements free lime results from incomplete reactions during burning. This apparently results in encapsulation of the free lime by slowly hydrating cement compounds which in turn prevents early hydration of free lime. Delayed hydration in concrete may result in disruptive expansion. In this invention the free lime is apparently surrounded by such rapidly hydrating compounds as $C_3S$, and $C_3A$, and not by $C_2S$. Thus the basic cause of delayed hydration is eliminated.

Thus, the novel expansive cement composition of the subject invention can be used as an expansive component or additive for conventional cements such as Portland cement, or it can also be used solely as an expansive cement, depending upon its composition. If used alone as an expansive cement, conventional amounts of gypsum may be added as a set regulator as in conventional cements. The expansive cement composition of the subject invention most preferably consists essentially of from about 1 to about 70% free lime with the remainder being predominantly tricalcium silicate ($C_3S$).

It is also noted that the subject invention will be described in terms of free lime or CaO, and it is to be understood that the other alkaline earth oxides and preferably other alkaline earth oxides selected from barium oxide and strontium oxide can be substituted in whole or in part for the calcium oxide which is preferably used in the scope of this invention.

Furthermore, it is noted that the expansive component of the subject invention can be manufactured from conventional ingredients which are normally fed to a Portland cement kiln. Accordingly, constituents other than free lime and tricalcium silicate can be present within the composition. For example, the composition can contain aluminate generally in the form of tricalcium aluminate ($C_3A$) and iron generally in the form of tetracalcium aluminoferrite ($C_4AF$). In addition, this composition can contain minor quantities of other impurities normally found in feed in Portland cement kilns, such as phosphates, alkali and magnesia. In addition, mineralizers such as fluorspar may be added. These components are no more deleterious in the expansive component of the subject invention than they are in conventional Portland cements and the expansive component of the subject invention can tolerate these components to the same extent as they can be tolerated within conventional Portland cement. Generally, the expansive component of the subject invention will have a liquid phase of from about 15 to about 30% by weight and more preferably from about 18 to about 28% by weight thereof as calculated by the well known method of Lea and Parker, which is set forth in Building Research Technical Paper No. 16, His Majesty's Stationery Office, London, 1935, which is herein incorporated by reference into this application. For example, when the composition of the subject invention is made at the preferred temperature of between about 2,650°F and about 2,750°F, the percent liquid phase at this temperature based on the percentage contents of $Al_2O_3$, $Fe_2O_3$, MgO, $K_2O$ and $Na_2O$ in the clinker will be 3.0 ($\%Al_2O_3$) + 2.25 ($\%Fe_2O_3$) + $\%MgO$ + $\%K_2O$ + $\%Na_2O$. As the percentage liquid phase formed depends upon the burning temperature and is lower when the burning temperature is also lower, it is noted that when the composition of the subject invention is made at a temperature of about 2,550°F, the percent liquid phase will be 2.95 ($\%Al_2O_3$) + 2.20 ($\%Fe_2O_3$) + $\%MgO$ + $\%K_2O$ + $\%Na_2O$. As a further example, when the composition of the subject invention is made at a temperature of about 2,450°F, which corresponds to the quaternary eutectic of the quaternary ststem CaO-$Al_2O_3$-$SiO_2$-$Fe_2O_3$, and if the ratio $Al_2O_3/Fe_2O_3$ is above 1.38, the percent liquid phase will be 6.1 ($\%Fe_2O_3$) + $\%MgO$ + $\%K_2O$ + $\%Na_2O$, and if the ratio $Al_2O_3/Fe_2O_3$ is below 1.38, the percent liquid phase will be 8.50 ($\%Al_2O_3$) − 5.22 ($\%Fe_2O_3$) + $\%MgO$ +$\%K_2O$ + $\%Na_2O$. It is generally preferable that the aluminates and ferrites and other impurities be less than about 30% of weight of the final composition.

Thus, it is preferred that all the silicate in the expansive cement composition of the subject invention be present in the form of tricalcium silicate ($C_3S$) and that the novel composition contain substantially none, and preferably no dicalcium silicate ($C_2S$). Applicants have found that a substantial amount of dicalcium silicate is deletrious to the novel composition because its presence causes delayed hydration of the lime. Accordingly, it is preferred that at most, about 5% by weight of the dicalcium silicate and most preferably that no dicalcium silicate by present in the composition of the subject invention.

Furthermore, the composition of the subject invention should have a particle size no larger than about 20 mesh (Tyler) and a Blaine fineness of no greater than about 6,000 cm$^2$/gm as determined by ASTM C204-68. More preferably, the expansive cement composition of the subject invention should have a particle size that passes 80 mesh (Tyler), and a fineness of no greater than 4,000 cm$^2$/gm. Even more preferably, the expansive cement composition of the subject invention has a particle size that substantially passes 100 mesh (Tyler), and a fineness in the range of from 1,500 to 3,000 cm$^2$/gm.

The expansive cement composition of the subject invention is preferably made from argillaceous and calcareous reactant materials which are normally used in the production of Portland cement clinker. The basic difference in making the expansive cement composition of the subject invention from that of a typical Portland cement clinker is that the components are selected to yield an excess of from about 1 to about 70% by weight of the free lime after complete stoichiometric reaction of the other constituents with lime, and the kiln is operated under such conditions that the starting silicate materials will react with the lime to the extent that the stoichiometric laws will allow and form primarily tricalcium silicate. This is accomplished by operating the kiln under "normal" to "hard burn"conditions. The kiln is conveniently operated at a temperature in the range of from about 2,300°F to about 2,900°F, and preferably between about 2,650°F to about 2,750°F, and the material is reacted in the burning zone of the kiln for a time sufficient to convert all or substantially all of the silicate material to tricalcium silicate. The hard burned clinker from the kiln generally comprises a hard densified material. Therefore, the alkaline earth oxide and silica should completely stoichiometrically react to form an alkaline earth silicate reaction product containing the maximum stoichiometric ratio of the alkaline earth oxide to the silica and containing substantially no alkaline earth silicates having a ratio of alkaline earth oxide to silica which is lower than said maximum. It is noted that feed materials which do not react under such burning conditions by reason of either size or composition are not to be considered in the stoichiometric calculations referred to above, even though they may be present in the feed.

After the burning operation, the clinker is cooled by conventional techniques such as air cooling or water quenching. Generally, it is preferred that the clinker be water quenched if a light color is desired. Next, the clinker is ground to a suitable particle size as generally set forth above.

Generally, when the expansive cement composition of the subject invention contains less than about 10% by weight of free lime therein, it can be used directly as an expansive cement. When used in admixture with Portland cement compositions, the expansive cement composition of the subject invention preferably contains from about 5 to 45% by weight of free lime, more preferably from about 10 to 35 % by weight of free lime and even more preferably from about 10 to about 30% by weight of free lime. For example, excellent compositions are formed which have from about 20% to about 28% by weight free lime. The expansive cement composition of the subject invention can be combined with any conventional Portland cement in any suitable proportion, e.g., from about 1 to about 99% by weight of expansive component in the resultant blend. Generally, satisfactory expansive cements can be made in accordance with the invention by admixing from by 10 to about 40% by weight the above-described expansive cement composition with from about 90 to about 60% by weight of Portland cement, respectively. The expansive cement composition can be tailored for expansiveness not only by controlling the amount of free lime therewithin but also by control of the particle size thereof. Generally, the fineness of the composition will regulate the rate of hydration and expansion. Very simple tests for particle size versus expansion time can be made to tailor the cement for any one particular situation.

The amount of expansion achieved in a concrete system containing an expansive component of the subject invention is generally proportional to the amount of free lime in the total composition or mixture which is utilized. In this regard, when the expansive component of the subject invention is blended with another hydratable cement such as Portland cement, it has been found that better control of the total cement mixture is accomplished when the free lime of the expansive component of the subject invention is within the range of from about 10 to about 30% by weight of such component, i.e., preferably more than about 10% but less than about 30% by weight. In essence, when blending the expansive component of the subject invention with conventional type cements to form an expansive composition, the linearity of the relationship of the amount of expansion to the amount of free lime in the total cement system in practicality, is more uniform when the cement system is blended utilizing a component of the subject invention containing free lime in the range of from about 10 weight % to about 30 weight % than when the cement system is blended utilizing a component of the subject invention containing substantially more than 30 weight % free lime. For example, the ability to uniformly control expansion of mixtures containing the expansive component of the subject invention diminishes as the free lime component of the expansive component is increased above about 30 weight % thereof because when using expansive compositions containing such large amounts of free lime, small variations in the amount of the expansive compositions being blended with other cement compositions will result in wider variations in the amount of expansion obtained.

A suitable expansive cement composition of the subject invention which can be used in admixture with Portland cement in any desired proportion will contain a free lime content of between 20 to 30% by weight and have a fineness of between 2,000 and 3,000 cm$^2$/gm. Furthermore, another suitable formulation of the expansive cement composition of the subject invention will contain a free lime content of about 45% by weight and have particles, all of which pass through a 100 mesh Tyler screen and have a fineness of no more than about 2,000 cm$^2$/gm. When the free lime content of the expansive cement composition of the subject invention is 45% by weight or higher, it is generally preferable not to have a fineness greater than 2,000 cm²/gm. However, if a larger initial expansion is required, then lime contents of 45% by weight or greater can be used at greater fineness values. Furthermore, the expansive cement composition of this invention can be tailored to give an initial rapid expansion followed by generally uniform slow expansion over a desired time period. A suitable example of such composition would include a material containing from about 5 to 40% by weight of free CaO and comprising a 50—50 blend of a uniform 3,000 cm²/gm material with a uniform 100 mesh (Tyler) screen material. Thus, as can be seen, the novel expansive cement composition of the subject invention can be tailored as desired for any particular job. As a general proposition, when the novel cement composition of the subject invention is used alone or in admixture with Portland cement to produce a shrinkage-compensating cement, then it is generally preferred that the final free lime content in the resultant composition or mixture, as the case may be, be from about 2 to 10 wt % thereof. "Chemical prestressing" compositions can be made by increasing the amount of free lime within the composition.

The expansive cement composition of the subject invention can be manufactured in lots containing varying free lime contents (from 1–70% by weight) and varying particle sizes so long as the particle size is smaller than about 20 mesh Tyler screen and results in a fineness of no greater than about 6,000 cm²/gm. Each lot can be placed in a storage silo and thereafter blended with Portland cement compositions, for example, normal Type I Portland cement and then marketed in package or bulk.

It is not completely understood how the cement composition of the subject invention functions as an expansive composition. It is presently believed that the association of the free lime with the tricalcium silicate in the absence of any or substantially no amounts of dicalcium silicate is the key to the expansive quality of the composition. In ordinary Portland cement, the free CaO particles are firmly enclosed in cement compounds including dicalcium silicate. This coating is sufficient to prevent early hydration of the CaO. Thus, if large amounts of free CaO are present (more than a few percent, e.g., more than about 2% by weight) in an ordinary Portland cement composition, the resultant encapsulation of the CaO leads to delayed hydration and disruptive expansion which can occur over a period of several years. However, the association of the CaO and the tricalcium silicate in the expansive component of the subject invention and the substantial absence of any dicalcium silicate results in slightly retarded lime hydration but essentially complete lime hydration within the period of about a week. It is believed that this imparts the expansive quality to the composition. It is theorized that the hard burning of the cement ingredients in the kiln not only completely converts the silicates to tricalcium silicates and leaves a substantial excess of the free lime but it also results in very finely divided densified particles of free CaO which are thinly coated with tricalcium silicate and/or other rapidly hydrating cement compounds (excluding dicalcium silicate). Thus, when the composition of the subject invention whether used alone, or blended with other cement compositions is admixed with water, the water will penetrate through the other rapidly hydrating cement compounds such as tricalcium silicate (after they have become rapidly hydrated) and then hydrate the free lime. This process results in beneficial delayed hydration of the lime. In essence, substantial hydration of the free lime begins only after the cement has set, but it is substantially complete within about 6 or 7 days, and this results in the effective and commercially valuable expansion of the hydrating composition. The resulting composition has the same chemical ingredients as Portland cement and contains no additives such as sulfoaluminates which differ in chemical specie from Portland cement components.

The resulting composition forms concrete which is generally stronger than conventional expansive cement concrete. In addition, the novel cement composition of the subject invention, whether used alone or in combination with other Portland cement can be cured under dry weather conditions, has no greater water requirements than ordinary Portland cement, will set at high temperatures, is sulfate-resistant, and generally inexpensive to manufacture. The novel cement composition of the subject invention provides a material which will allow industry to actually tailor the expansive quality of the cement composition for particular construction operations in a more precise manner than was heretofore known in the art. As stated above, the expansive component of the subject invention can be utilized alone as an expansive cement composition or it can be blended with conventional cement compositions to impart expansive qualities thereto. For example, the cement composition of the subject invention can be used with all types of Portland cement including ASTM Types I through V, masonry Portland cement, special colored Portland cement such as disclosed in U.S. Pat. No. 3,667,976, and pozzolanic cements such as ASTM Type IP. Pozzolanic cements include cements containing fly ash, slag, or volcanic materials often used as a blend in various Portland cements. In addition, the cement composition of the subject invention can be used with non-Portland cements, such as calcium aluminate cements and gypsum cements.

The following examples are given to better facilitate the understanding of this invention and are not intended to limit the scope thereof.

EXAMPLE I

An expansive cement composition was made in accordance with this invention initially by hard burning an argillaceous and calcareous rock (Austin chalk) in a cement kiln. The mixture was hard burned at a temperature of about 2,750°F in a burning zone to produce a hard densified product. The product was air quenched and then ground in a ball mill to a fineness of 2,619 cm²/gm as determined by ASTM C204-68. All of the particles had a size smaller than 20 mesh (Tyler) and 86.1 passed through a 200 mesh Tyler screen while 80.1% of the particles passed through a 325 mesh Tyler screen. The resulting composition consisted of 41.9% free CaO with the remaining components being tricalcium silicate, tricalcium aluminate, and tetracalcium aluminoferrite, with tricalcium silicate being the major constituent in the mix other than the free lime. The analysis of the composition (with the exception of about 0.3 wt % alkalies which were present therein) is set forth in Table 1 below. This composition will be hereinafter referred to as Expansive Composition A.

TABLE 1

| COMPOSITION | PERCENT BY WEIGHT |
| --- | --- |
| $SiO_2$ | 9.08 |
| $Al_2O_3$ | 4.42 |
| $Fe_2O_3$ | 2.80 |
| $CaO$ | 81.75 |
| $MgO$ | 0.91 |
| Loss on Ignition | 2.26 |

Next, Expansive Composition A was blended with a buff colored Portland cement composition which was made by the process generally set forth in U.S. Pat. No. 3,667,976. This buff colored cement composition had a fineness of 3775 $cm^2$/gm and an analysis set forth in Table 2 below.

TABLE 2

| COMPOSITION | Buff Colored Portland Cement PERCENT BY WEIGHT |
| --- | --- |
| $SiO_2$ | 21.0 |
| $Al_2O_3$ | 4.8 |
| $Fe_2O_3$ | 3.0 |
| $CaO$ | 65.8 |
| $MgO$ | 1.0 |
| $SO_3$ | 2.9 |
| $TiO_2$ | 0.72 |
| Ignition Loss | 1.3 |

More specifically, the neat cement paste was made by mixing 70 parts by weight of the buff colored Portland cement with 30% by weight of Expansive Composition A and admixing 40% by weight water therewith. The resulting wet slurry was poured into a steel mold to form a 1 ×1 ×10 test bar. The test bar was cured in moist air at 73°F and a dial comparator was used to measure its expansion over a 7 day period. The results are set forth in Table 3 below:

TABLE 3

| Age of Curing (days) | Expansion % change in length based on a 24 hour initial measurement |
| --- | --- |
| 2 | 0.285 |
| 3 | 0.310 |
| 4 | 0.335 |
| 5 | 0.360 |
| 6 | 0.375 |
| 7 | 0.390 |

This example clearly indicates the beneficial expansion which is imparted to a hydrated cement composition by the expansive cement composition of the subject invention.

EXAMPLE II

In this example, various percentages of the above-described Expansive Composition A, set forth in Example I were admixed with the buff colored Portland cement composition, generally described in Example I, and with a Type I Portland cement in a standard concrete mix, and the restrained expansions of the resulting samples were measured. In addition, the restrained expansions of the concrete mixes of the pure buff colored Portland cement, the pure Type I Portland cement and a pure Type S Portland cement were also measured. Restraint was obtained by the use of a ¼ inch diameter steel bar in a 3 ×3 ×10 inches specimen. The Type I Portland cement which was utilized was a typical type I Portland cement having a finess of 3,150 $cm^2$/gm, and an analysis as set forth in Table 4 below:

TABLE 4

| COMPOSITION | Type I Portland Cement PERCENT BY WEIGHT |
| --- | --- |
| $SiO_2$ | 21.0 |
| $Al_2O_3$ | 5.5 |
| $Fe_2O_3$ | 2.9 |
| $CaO$ | 65.6 |
| $MgO$ | 0.8 |
| $SO_3$ | 2.8 |
| Ignition Loss | 1.2 |

The Type S cement which was utilized had a fineness of 3710 $cm^2$/gm and had an analysis as set forth below in Table 5 below:

TABLE 5

| COMPOSITION | Type S Portland Cement PERCENT BY WEIGHT |
| --- | --- |
| $SiO_2$ | 18.12 |
| $Al_2O_3$ | 8.28 |
| $Fe_2O_3$ | 1.91 |
| $CaO$ | 63.71 |
| $MgO$ | 1.11 |
| $SO_3$ | 4.76 |
| $Mn_2O_3$ | 0.09 |
| Ignition Loss | 0.84 |

Seven concrete mixes were prepared.

The cement portion of mix No. 1 consisted of 5% by weight of Expansive Composition A and 95% by weight of the buff colored Portland cement. The cement portion of mix No. 2 consisted of 10 % by weight of Expansive Composition A and 90% by weight of the buff colored Portland cement. The cement portion of mix No. 3 consisted of 5% by weight of Expansive Composition A and 95% by weight of the Type I Portland cement. The cement portion of mix No. 4 consisted of 7.5% by weight of Expansive Composition A and 92.5% by weight of the Type I Portland cement. The cement portion of mix No. 5 consisted of the pure buff colored Portland cement. The cement portion of mix No. 6 consisted of the pure Type I Portland cement. Each of these cement compositions was admixed with aggregate and water in a standard concrete mix design with a cement factor of 6 sacks of cement per cubic yard of finished concrete. Each sample comprised 20 parts by weight of cement, 44.9 parts by weight of sand, 69.7 parts by weight of coarse aggregate (crushed limestone), and sufficient water (about 11 parts by weight) so that the resulting sample mixes had a slump of 5 inches as determined by the method of ASTM C143-69. The sample mixtures were poured into standard Portland Cement Association 2 prism molds, and each having a steel reinforcing rod extending longitudinally through the mold and connecting to two steel plates on the opposite ends thereof which resulted in 0.3% steel in the mold cross section.

Two 3 x 3 x10 test bars were made up for each sample. All of the test bars were initially cured under water at 73°F for 7 days. After that, one of the test bars for each mix was then cured in ambient air for 14 additional days and the remaining test bar for each mix continued to cure under water at 73°F for 21 additional days. A dial comparator was used to measure the expansion of the resulting concrete test bars and the results are based upon a 6 hour initial reading for each bar and are set forth in Table 6 below. Thus, the values for 1, 3, and 7 days at 73° under water are the arithmetic mean of the expansion of two test bars for each sample, and the remaining entries in the Table are measurements for single test bars.

This material will be hereinafter referred to as Expansive Composition B.

EXAMPLE IV

Another expansive cement composition of this invention was produced by hard burning an argillaceous and calcareous raw mix in a kiln. The ratio of calcareous to argillaceous material was controlled such that the re-

TABLE 6

| Mix No. | Restrained Expansion (%) Days at 73°F under water | | | | | | Days in Ambient Air | |
|---|---|---|---|---|---|---|---|---|
| | 1 | 3 | 7 | 14 | 21 | 28 | 14 | 21 |
| 1(Buff with 5% Ex. Comp. A | 0.018 | 0.028 | 0.020 | 0.026 | 0.026 | 0.030 | 0.009 | 0.010 |
| 2(Buff with 10% Ex. Comp. A | 0.049 | 0.054 | 0.056 | 0.049 | 0.050 | 0.054 | 0.059 | 0.057 |
| 3(Type I with 5% Ex. Comp. A | 0.026 | 0.024 | 0.024 | 0.027 | 0.034 | 0.035 | 0.022 | 0.017 |
| 4(Type I with 7.5% Ex. Comp. A | 0.041 | 0.043 | 0.044 | 0.047 | 0.056 | 0.056 | 0.044 | 0.036 |
| 5(Buff) | 0.005 | 0.004 | 0.002 | 0.007 | 0.003 | 0.004 | (0.007) | (0.003) |
| 6(Type I) | 0.004 | 0.006 | (0.002) | 0.004 | 0.006 | .003 | (0.005) | (0.016) |
| 7(Type S) | 0.018 | 0.022 | 0.021 | 0.025 | 0.027 | 0.030 | 0.014 | 0.011 |

The numbers in parentheses indicate shrinkage.

The above table clearly indicates that the expansive cement composition of the subject invention can be blended in various proportions with conventional Portland cements to produce expansive cement compositions whichh will expand either more than or equal to conventional expansive cement compositions such as Type S cement.

EXAMPLE III

Still another expansive cement composition of the subject invention was produced by hard burning an argillaceous and calcareous raw mix in a kiln. The ratio of calcareous to argillaceous material was controlled such that the resulting mix would have been between about 18% by weight and 19% by weight free lime therewithin. The mixture was passed into a kiln and heated to a temperature of about 2,689°F. The material from the kiln was water quenched and then ground to a fineness of 2,594 cm²/gm and 98.7% by weight of the particles passed through a 200 mesh Tyler screen and 91.7% by weight of the material passed through a 325 mesh Tyler screen. The resulting composition had 18.4% by weight free lime and the remaining constituents were tricalcium silicate, tricalcium aluminate, and tetracalcium aluminoferrite, with a trace of magnesia. The composition was analyzed and the results of the analysis (with the exception of about 0.3 wt. % alkalies which are present in the composition) are set forth in Table 7 below:

TABLE 7

| COMPOSITION | PERCENT BY WEIGHT |
|---|---|
| SiO₂ | 15.66 |
| Al₂O₃ | 4.68 |
| Fe₂O₃ | 3.52 |
| CaO | 74.24 |
| MgO | 0.70 |
| Ignition Loss | 1.98 | sulting mix would have between about 22% by weight and 23% by weight free lime therewithin. The mixture was passed into a kiln and heated to a temperature of about 2640°F. The clinker from the kiln was air cooled and then ground to a fineness of 3432 cm²/gm and 95.6% by weight of the particles passed through a 200 mesh Tyler screen and 88.5% by weight of the material passed through a 325 mesh Tyler screen. The resulting composition had 22.9% by weight free lime and the remaining constituents were tricalcium silicate, tricalcium and aluminate, and tetracalcium aluminoferrite, with a trace of magnesia. The composition was analyzed and the results of the analysis (with the exception of about 0.3 wt. % alkalies) which were present in the composition are set forth in Table 8 below:

TABLE 8

| COMPOISITION | PERCENT BY WEIGHT |
|---|---|
| SiO₂ | 14.74 |
| Al₂O₃ | 4.13 |
| Fe₂O₃ | 2.79 |
| CaO | 76.28 |
| MgO | 0.74 |
| Ignition Loss | 1.25 |

This material will hereinafter be referred to as Expansive Composition C.

EXAMPLE V

Still another expansive cement composition of the subject invention was produced by hard burning an argillaceous and calcareous raw mix in a kiln. The ratio of calcareous to argillaceous material was controlled such that the resulting mix would have between about 24 and 25% by weight free lime therewithin. Fluorspar (calcium fluoride) was also added to the raw mix at a composition of 1.5% by weight to act as a mineralizer, and insure a more complete reaction between the other mix components. The mixture was passed into a kiln and heated to a temperature of about 2,650°F. The clinker from the kiln was air cooled and then ground to a fineness of 2619 cm²/gm and 98.1% by weight of the particles passed through a 200 mesh Tyler screen and 88.8% by weight of the particles passed through a 325 mesh Tyler screen. The resulting composition had 24.3% by weight free lime and the remaining constituents were tricalcium silicate, tricalcium aluminate, and tetracalcium aluminoferrite, with a trace of magnesia and fluorspar. The composition was analyzed and the results of the anaylsis (with the exception of about 0.3 wt. % alkalies which were present in the composition) are set forth in Table 9 below:

TABLE 9

| COMPOSITION | PERCENT BY WEIGHT |
|---|---|
| SiO₂ | 14.50 |
| Al₂O₃ | 3.71 |
| Fe₂O₃ | 2.81 |
| CaO | 78.15 |
| MgO | 0.72 |
| Ignition Loss | 0.67 |

This material will be hereinafter referred to as Expansive Composition D.

EXAMPLE VI

Concrete test bar samples were prepared for restrained expansion tests using Expansive Composition B, Expansive Composition C, and Expansive Composition D, set forth in the above examples. The cement portion of mix No. 8 consisted of 30% by weight of Expansive Composition B and 70% by weight of the above-described buff colored Portland cement. The cement portion of mix No. 9 consisted of 25% by weight of Expansive Composition C and 75% by weight of the above-described buff colored Portland cement. The cement portion of mix No. 10 consisted of 25% by weight of expansive composition D and 75% by weight of the above-described buff colored Portland cement. Each of these cement mixtures was admixed with aggregate and water in a standard mix design with a cement factor of 6 sacks of cement per cubic yard of finished concrete. Each sample comprised 20 parts by weight of cement, 44.9 parts by weight of sand, 69.7 parts by weight of coarse aggregate (crushed limestone), and sufficient water (about 11 parts by weight) so that the resulting sample mixes had a slump of 5 inches as determined by the method of ASTM C143-69. The sample mixtures were poured into standard Portland Cement Association two prism molds, each having a steel reinforcing rod extending longitudinally through the mold and connecting to two steel plates on the opposite ends thereof, which resulted in 0.3% steel in the mold cross section. Two 3 × 3 × 10 test bars were molded for each mix 8, mix 9, and mix No. 10. All of the test bars were initially cured under water at 73°F for 7 days. After that, one of the test bars for each mix was then cured in ambient air for 14 additional days and the remaining test bar for each mix continued to cure under water at 73°F for 21 additional days. A dial comparator was used to measure the expansion of the resulting concrete test bars and the results are based upon a 6 hour initial reading for each bar and are set forth in Table 10 below. Thus, the values for 1, 3, and 7 days at 73°F under water are the arithmetic mean of the expansion of two test bars for each sample, and the remaining entries in Table 10 are measurements for single test bars.

TABLE 10

| Mix No. | Restrained Expansion (%) Days at 73°F under water | | | | | | Days in Ambient Air | |
|---|---|---|---|---|---|---|---|---|
| | 1 | 3 | 7 | 14 | 21 | 28 | 14 | 21 |
| 8 (Buff with 30% Ex. Comp. B) | 0.060 | 0.062 | 0.068 | 0.073 | 0.079 | 0.078 | 0.067 | 0.053 |
| 9 (Buff w/ 25% E. Comp. C) | 0.089 | 0.097 | 0.102 | 0.102 | 0.103 | 0.107 | 0.098 | 0.085 |
| 10 (Buff w/ 25% Ex. Comp. D) | 0.113 | 0.126 | 0.129 | 0.131 | 0.129 | 0.133 | 0.133 | 0.113 |

The above table clearly illustrates the versatility of the cement expansive compositions within the subject invention. The use of water quenching techniques, and the addition of mineralizers have no adverse effect on expansion.

EXAMPLE VII.

Concrete test bar samples were prepared using expansive Composition D for both restrained and unrestrained expansion tests. The concrete used in mix No. 11, consisting of 25% by weight of expansive cement composition D and 75% by weight of the above-described buff colored Portland cement, was the same as mix No. 10 in Example VI. The molding procedures were also the same as described in Example VI. The bars each were cast into the above molds containing 0.0%, 0.15%, 0.30% and 0.70% steel in the mold cross section. All the test bars were cured under water at 73°F for 14 days. A dial comparator was used to measure expansion of the resulting concrete test bars and the results are based upon a six hour reading for each bar and are set forth in Table 11 below.

TABLE 11

| Mix No. | | Restrained Expansion (%) % Restraining Steel | Days at 73°F under water | | | |
|---|---|---|---|---|---|---|
| | | | 1 | 3 | 7 | 14 |
| 11 | (Buff with 25% Ex. Comp. D) | 0.0 | 0.718 | 0.749 | 0.750 | 0.751 |
| | | 0.15 | 0.197 | 0.213 | 0.217 | 0.218 |
| | | 0.30 | 0.113 | 0.126 | 0.129 | 0.131 |
| | | 0.70 | 0.059 | 0.066 | 0.070 | 0.070 |

The above table shows the usefulness of the subject invention as applied to chemical prestress applications.

EXAMPLE VIII

Flexural and compressive strength tests were run on 3×3×10 inch non-reinforced concrete test bars made of the same formulations which correspond to mixes 1 through 10 as set forth in the above examples. Furthermore, concrete test bars (having the same standard mix design as set forth in Example II) were made up as a comparison for a standard Type K cement composition.

This Type K cement had an aluminosulfate expansive additive therewithin. The Type K cement was analyzed and was found to have the analysis as set forth in Table 12 below.

TABLE 12

| ANALYSIS OF THE TYPE K CEMENT | |
|---|---|
| COMPOSITION | PERCENT BY WEIGHT |
| $SiO_2$ | 19.29 |
| $Al_2O_3$ | 6.52 |
| $Fe_2O_3$ | 2.50 |
| CaO | 62.33 |
| MgO | 0.59 |
| $SO_3$ | 5.99 |
| $TiO_2$ | 0.18 |
| Ignition Loss | 1.79 |

Test bars were made up for each sample composition and cured for the test period at 73°F in moist air. Furthermore, as a comparison, test bars for mix No. 12 (pure Type K) were prepared according to the same mix design and procedures as mixes 1 through 10. The flexural strength of the concrete test bars was determined in accordance wtih the method set forth in ASTM C293-68. Each flexural strength value as set forth in Table 13 below, represents the means of two determinations.

The above-described flexural strength test requires that the test bar be placed as a span between two steel bars and a third steel bar placed in the middle thereof and force be applied thereto until the bar fails. Thus, each of the test bars used for sample 1 through 10 and 12 was broken into two parts in the flexural test. Each of these broken segments for each test bar was then subjected to compressive strength tests in accordance with ASTM C116-68. The results of the compressive strength tests are set forth in Table 14 below. Each compressive strength value represents the mean of 4 determinations.

TABLE 14

| | Compressive Strength (psi) Days at 73°F in Moist Air | | | |
|---|---|---|---|---|
| Mix No. | 1 | 3 | 7 | 28 |
| 1 (Buff with 5% Ex. Comp. A) | 2260 | 4522 | 5667 | 6449 |
| 2 (Buff with 10% Ex. Comp. A) | 2403 | 4206 | 4928 | 6515 |
| 3 (Type I with 5% Ex. Comp. A) | 2117 | 3864 | 5564 | 6461 |
| 4 (Type I with 7.5% Ex. Comp. A) | 1679 | 3431 | 4674 | 5972 |
| 5 (Buff) | 2493 | 5211 | 6171 | 6530 |
| 6 (Type I) | 1501 | 3221 | 4974 | 6476 |
| 7 (Type S) | 2021 | 4210 | 5188 | 5921 |
| 8 (Buff with 30% Ex. Comp. B) | 2514 | 4057 | 5714 | 6522 |
| 9 (Buff with 25% Ex. Comp. C) | 2738 | 4898 | 5958 | 8055 |
| 10 (Buff w/25% Ex. Comp. D) | 2736 | 4944 | 6298 | 8153 |
| 12 (Type K) | 1358 | 4688 | 5780 | 6543 |

The strength tests set forth above shown that the concrete mixtures which are made using the expansive cement compositions of the subject invention exhibit strengths which are essentiallly equivalent to the flexural and compressive strengths of conventional expansive and non-expansive cements.

EXAMPLE IX

Another expansive cement composition of this invention was produced by burning an argillaceous and cal-

TABLE 13

| | Flexural Strength (psi) Days at 73°F in Moist Air | | | |
|---|---|---|---|---|
| Mix No. | 1 | 3 | 7 | 28 |
| 1 (Buff with 5% Ex. Comp. A) | 423 | 600 | 985 | 1132 |
| 2 (Buff with 10% Ex. Comp. A) | 465 | 860 | 975 | 1082 |
| 3 (Type I with 5% Ex. Comp. A) | 420 | 800 | 998 | 917 |
| 4 (Type I with 7.5% Ex. Comp. A) | 390 | 775 | 983 | 890 |
| 5 (Buff) | 513 | 998 | 1128 | 1237 |
| 6 (Type I) | 250 | 700 | 805 | 1000 |
| 7 (Type S) | 348 | 845 | 895 | 995 |
| 8 (Buff with 30% Ex. Comp. B) | 513 | 723 | 1035 | 1200 |
| 9 (Buff with 25% Ex. Comp. C) | 610 | 940 | 940 | 1083 |
| 10 (Buff w/25% Ex. Comp. D) | 545 | 875 | 1087 | 1138 |
| 12 (Type K) | 323 | 825 | 1068 | 1162 | careous raw mix in a large commercial rotary kiln. The ratio of calcareous to argillaceous material was controlled such that the resulting mix would have between about 26% by weight and 27% by weight free lime therewithin. The mixture was passed into the kiln and heated to a temperature of about 2,750°F. The clinker from the kiln was rapidly quenched by being discharged into a tank of water. It was subsequently passed through a rotary drier, and ground in a closed circuit grinding system to a fineness of 2,569 cm²/gm and 93.8% by weight of the particles passed through a 100 mesh Tyler screen, 79.8 % by weight of the material passed through a 200 mesh Tyler screen, and 75.0% of the material passed through a 325 mesh Tyler screen. The resulting ground clinker composition had 26.6% by weight free lime and the remaining constituents were tricalcium silicate, tricalcium aluminate, and tetracalcium aluminoferrite, with a trace of magnesia. The composition was analyzed and the results of the analysis are set forth in Table 15 below:

TABLE 15

| COMPOSITION | PERCENT BY WEIGHT |
|---|---|
| $SiO_2$ | 13.8 |
| $Al_2O_3$ | 5.3 |
| $Fe_2O_3$ | 3.0 |
| CaO | 75.1 |
| MgO | 0.6 |
| $SO_3$ | 0.2 |
| $Na_2O$ | 0.2 |
| $K_2O$ | 0.4 |
| Ignition Loss | 2.1 |

This material will be hereinafter referred to as Expansive Component E.

EXAMPLE X

Still another expansive composition of this invention was produced by burning an argillaceous and calcareous mix in a large commercial rotary kiln. The ratio of calcareous to argillaceous material was controlled such that the resulting mix would have between about 23% by weight and 24% by weight free lime therewithin. The mixture was passed into the kiln and heated to a temperature of about 2,750°F. The clinker from the kiln was air cooled and then ground with gypsum in a closed circuit grinding system to a fineness of 3,831 cm/gm and 97.8% by weight of the particles passed through a 200 mesh Tyler screen, and 90.2 % by weight of the material passed through a 325 mesh Tyler screen. The resulting ground cement composition had 22.4% by weight free lime and the remaining constituents were tricalcium silicate, tricalcium aluminate, and tetracalcium aluminoferrite, with a trace of magnesia. The composition was analyzed and the results of the analysis are set forth in Table 16 below:

TABLE 16

| COMPOSITION | PERCENT BY WEIGHT |
|---|---|
| $SiO_2$ | 13.90 |
| $Al_2O_3$ | 4.59 |
| $Fe_2O_3$ | 3.44 |
| CaO | 71.83 |
| MgO | 1.41 |
| $SO_3$ | 2.45 |
| $Na_2O$ | 0.12 |
| $K_2O$ | 0.62 |
| Ignition Loss | 2.10 |

This material will be hereinafter referred to as Expansive Composition F.

EXAMPLE XI.

Concrete test bar samples were prepared for restrained expansion tests using Expansive Composition E and Expansive Composition F, set forth in the above examples. The cement portion of mix No. 13 consisted of 20% by weight of Expansive Composition E and 80% by weight of the above-described buff colored Portland cement. The cement portion of mix No. 14 consisted of 30% by weight of Expansive Composition E and 70% by weight of the above-described buff colored Portland cement. The cement portion of mix No. 15 consisted entirely of the above-described Type I Portland cement. The cement portion of mix No. 16 consisted of 15% by weight of expansive composition F and 85% by weight of the above-described Type I Portland cement. The cement portion of mix No. 17 consisted of 20% by weight of expansive composition F and 80% by weight of the above-described Type I Portland cement. The cement portion of mix No. 18 consisted of 25% by weight of expansive composition F and 75% by weight of the above-described Type I Portland cement. The cement portion of mix No. 19 consisted of 30% by weight of expansive composition F and 70% by weight of the above-described Type I Portland cement. The cement portion of mix No. 20 consisted of 35% by weight of expansive composition F and 65% by weight of the above-described Type I Portland cement. Each of the cement mixtures was admixed with aggregate and water in a standard mix design with a cement factor of six sacks of cement per cubic yard of finished concrete. Each sample comprised 20 parts by weight of cement, 44.9 parts by weight of sand, 69.7 parts by weight of coarse aggregate (crushed limestone), and sufficient water (about 11 parts by weight) so that the resulting sample mixes had a slump of five inches as determined by the method of ASTM C143-69. The sample mixtures were poured into standard Portland Cement Association two prism molds, each having a steel reinforcing rod extending longitudinally through the mold and connecting to two steel plates on the opposite ends thereof, which resulted in 0.3% steel in the mold cross-section. Two 3×3×10 inch test bars were molded for each mix 13, mix 14, mix 15, mix 16, mix 17, mix 18, mix 19 and mix 20. All of the test bars were initially cured under water at 73°F for seven days. After that, one bar was removed, and the remaining test bar for each mix continued to cure under water at 73°F for 21 additional days. Each bar was then sealed within a polyethylene bag to prevent loss of water and placed in a cabinet at 100°F for 28 additional days. After that, each bar was removed from the polyethylene bag and placed in a 180°F steam cabinet for 28 additional days. Then each bar was autoclaved at a steam pressure of 300 psi for three hours. A dial comparator was used to measure the expansion of the resulting concrete test bars, and the results are based upon a six hour initial reading for each bar and are set forth in Table 17. Thus, the values for 1 and 7 days at 73°F under water are the arithmetic mean of the expansion of two test bars for each sample, and the remaining entries in Table 17 are measurements for single test bars.

TABLE 17

| Mix No. | | Restrained Expansion (%) | | | | | at 100°F in Air | at 180°F Steam | Auto-claved |
|---|---|---|---|---|---|---|---|---|---|
| | | Days at 73°F Under Water | | | | | | | |
| | | 1 | 7 | 14 | 21 | 28 | 56 | 84 | 85 |
| 13 | (Buff w/ 20% ex. Comp. E) | 0.042 | 0.051 | 0.059 | 0.065 | 0.065 | 0.062 | 0.120 | 0.151 |
| 14 | (Buff w/ 30% Ex. Comp. E) | 0.091 | 0.113 | 0.122 | 0.139 | 0.141 | 0.176 | 0.240 | 0.265 |
| 15 | (Type I with 0% Ex. Comp. F) | 0.004 | 0.004 | 0.002 | 0.002 | 0.003 | 0.029 | 0.036 | 0.046 |
| 16 | (Type I with 15% Ex. Comp. F) | 0.023 | 0.027 | 0.028 | 0.028 | 0.030 | 0.023 | 0.042 | 0.073 |
| 17 | (Type I w/ 20% Ex. Comp. F) | 0.043 | 0.051 | 0.053 | 0.054 | 0.052 | 0.054 | 0.064 | 0.090 |
| 18 | (Type I w/ 25% Ex. Comp. F) | 0.065 | 0.073 | 0.071 | 0.071 | 0.071 | 0.073 | 0.081 | 0.106 |
| 19 | (Type I with 30% Ex. Comp. F) | 0.082 | 0.089 | 0.090 | 0.090 | 0.091 | 0.100 | 0.102 | 0.127 |
| 20 | (Type I with 35% Ex. Comp. F) | 0.093 | 0.104 | 0.103 | 0.103 | 0.113 | 0.098 | 0.113 | 0.200 |

The above table shows the range of expansions which may be achieved by the blending of an expansive composition within the subject invention and a Portland cement. Thus, any degree of expansion in the concrete from a shrinkage compensating effect to a high degree of pre-stressing, may be easily achieved by blending an expansive composition with a Portland cement in the range of from 15 to 35% by weight of the expansive composition. This great advantage of controlling the expansions diminishes rapidly as the free lime content of the expansive composition is increased above about 30% since then rather small variations in the amount of expansive composition being blended will result in much wider variations in the amount of expansion obtained. Additionally, the table shows that little additional expansion occurs at longer ages, even upon being subjected to progressively increasing temperature conditions and finally autoclaving. As shown, most of the expansion occurring during the autoclave conditions is caused by the Type I Portland cement. Thus, the long-term delayed disruptive expansion will not occur when using the expansive composition of the subject invention.

EXAMPLE XII.

Flexural and compressive strength tests were run on 3×3×10 inch non-reinforced concrete test bars made of the same formulations which correspond to mixes 13 through 20 as set forth in the above examples. Test bars were made up for each sample composition and cured for the test period at 73°F in moist air. The flexural strength of the concrete test bars was determined in accordance with the method set forth in ASTM C293-68. Each flexural strength value as set forth in Table 18 below, represents the mean of two determinations.

TABLE 18

| | Flexural Strength (psi) | | |
|---|---|---|---|
| | Days at 73°F in Moist Air | | |
| Mix. No. | 1 | 7 | 28 |
| 13 (Buff with 20% Ex. Comp. E) | 482 | 942 | 937 |
| 14 (Buff with 30% Ex. Comp. E) | 435 | 895 | 297 |
| 15 (Type I with 0% Ex. Comp. F) | 322 | 917 | 957 |
| 16 (Type I with 15% Ex. Comp. F) | 338 | 1040 | 1100 |
| 17 (Type I with 20% Ex. Comp. F) | 212 | 853 | 875 |
| 18 (Type I with 25% Ex. Comp. F) | 262 | 840 | 850 |
| 19 (Type I with 30% Ex. Comp. F) | 310 | 707 | 763 |
| 20 (Type I with 35% Ex. Comp. F) | 204 | 780 | 938 |

The above-described flexural strength test requires that the test bar be placed as a span between two steel bars and a third steel bar placed in the middle thereof and force be applied thereto until the bar fails. Thus, each of the test bars used for samples 13 through 20 was broken into two parts in the flexural test. Each of these broken segments for each test bar was then subjected to compressive strength tests in accordance with ASTM C116-68. The results of the compressive strength tests are set forth in Table 19 below. Each compressive strength value represents the mean of four determinations.

TABLE 19

| Mix No. | Compressive Strength (psi) Days at 73°F in Moist Air | | |
|---|---|---|---|
| | 1 | 7 | 28 |
| 13 (Buff with 20% Ex. Comp. E) | 2521 | 5733 | 6485 |
| 14 (Buff with 30% Ex. Comp. E) | 2290 | 5112 | 4276 |
| 15 (Type I with 0% Ex. Comp. F) | 1803 | 5024 | 5915 |
| 16 (Type I with 15% Ex. Comp. F) | 1850 | 5694 | 5386 |
| 17 (Type I with 20% Ex. Comp. F) | 1682 | 5181 | 5647 |
| 18 (Type I with 25% Ex. Comp. F) | 1640 | 5100 | 6126 |
| 19 (Type I with 30% Ex. Comp. F) | 2079 | 4853 | 5408 |
| 20 (Type I with 35% Ex. Comp. F) | 2047 | 4226 | 5611 |

The strength tests set forth above show that the concrete mixtures which are made using the expansive cement composition of the subject invention exhibit strengths which are essentially equivalent to the flexural and compressive strengths of conventional cements, even when the expansive composition is present at levels as high as 30 or 35%.

While this invention has been described in relation to its preferred embodiments, it is to be understood that various modifications thereof will now be apparent to one skilled in the art upon reading this specification and it is intended to cover such modifications as fall within the scope of the appended claims.

We claim:

1. An expansive cement comprising a mixture of:
   a. from about 99 to about 1% by weight of a hydratable cement; and
   b. from about 1 to about 99% by weight of an expansive cement composition made from argillaceous and calcareous materials and containing from about 1 to about 30 weight % of free CaO, with the remaining portion being primarily tricalcium silicate and containing substantially no dicalcium silicate.

2. The expansive cement of claim 1 wherein said hydratable cement is Portland cement.

3. The expansive cement of claim 2 wherein said expansive cement composition has a particle size of no greater than about 20 mesh (Tyler) and a fineness no greater than about 6,000 cm²/gm.

4. The expansive cement of claim 3 containing from about 90 to about 60% by weight of said Portland cement and from about 10 to about 40% by weight of said expansive cement composition.

5. The expansive cement composition of claim 1 wherein said hydratable cement is a pozzolanic cement.

6. The expansive cement of claim 4 wherein said expansive cement contains from about 10 to about 30 wt % of said free CaO.

7. The expansive cement of claim 6 wherein said expansive cement composition has a particle size which passes 80 mesh (Tyler) and a fineness of no greater than 4,000 cm²/gm.

8. An expansive cement composition made from argillaceous and calcareous materials and containing from about 10 to about 30 weight % free CaO with the remaining portion being primarily a complete stoichiometric reaction product between CaO and silica and thereby containing the maximum ratio of said CaO to said silica and containing substantially no calcium silicates having a lesser ratio of said CaO to silica than said maximum.

9. An expansive cement composition made by burning mixtures of argillaceous and calcareous materials containing an excess of lime relative to silica to thereby convert substantially all of the silica into tricalcium silicate, said composition containing from about 10 to about 30 wt % of free CaO with the remaining portion being primarily tricalcium silicate and containing substantially no dicalcium silicate, and further having a liquid phase which forms during the burning thereof which is in the range of from about 15 to about 30 wt % of said composition.

10. An expansive cement composition made from argillaceous and calcerous materials and containing from about 1 to about 30 wt % of an alkaline earth oxide with the remaining portion being primarily the complete stoichiometric reaction product between said alkaline earth oxide and silica and thereby containing the maximum ratio of said alkaline earth oxide to said silica and containing substantially no alkaline earth silicates having a lesser ratio of said alkaline earth oxide to silica than said maximum.

11. The expansive cement composition of claim 10 wherein said alkaline earth oxide is selected from the group consisting of calcium oxide, barium oxide, strontium oxide and mixtures thereof.

12. The expansive cement composition of claim 11 having a particular size no longer than about 20 mesh (Tyler) and a fineness no greater than about 6,000 cm²/gm.

13. The expansive cement composition of claim 9 containing from about 10 to about 30% by weight of said alkaline earth oxide.

14. An expansive cement composition made by burning mixtures of argillaceous and calcareous materials containing an excess of lime relative to silica to thereby convert substantially all of the silica into tricalcium silicate, said composition containing from about 1 to about 30 wt % of free CaO with the remaining portion being primarily tricalcium silicate and containing substantially no dicalcium silicate.

15. The expansive cement composition of claim 14 having a particle size of not greater than about 20 mesh (Tyler) and a fineness of no greater than about 6,000 cm²/gm.

16. The expansive cement composition of claim 15 having a particle size which passes 80 mesh (Tyler) and a fineness of no greater than about 4,000 cm²/gm.

17. The expansive cement composition of claim 16 having a liquid phase formed during the burning thereof which comprises from about 15 to 30 wt % of said composition.

18. The expansive cement composition of claim 17 having a CaO content of between 20 and about 28% by weight thereof.

19. A method of producing an expansive cement composition comprising:
   a. introducing argillaceous and calcareous reactant materials to the feed end of a kiln, said calcareous reactants containing sufficient CaO forming materials to completely react with the agrillaceous reactant materials in the kiln and to provide an excess of unreacted CaO in the burned clinker in the range of from about 1 to about 30 wt % thereof;
   b. burning said reactant materials in a burning zone in said kiln for a sufficient time and temperature to convert substantially all of the silicate in said feed to tricalcium silicate and yield substantially no dicalcium silicate, but yet yield from about 1 to about 30 wt % of free lime in the resulting burned clinker; and c. grinding said clinker to produce a powdered hydraulic expansive cement composition.

20. The method of claim 19 wherein said clinker is ground to yield particles which are no larger than about 20 mesh (Tyler) and have a fineness of no greater than about 6,000 cm²/gm.

21. The method of claim 20 wherein said grinding produces particles which pass 80 mesh (Tyler) and having a fineness of no greater than 4,000 cm²/gm.

22. The method of claim 21 wherein said cement composition is ground to a fineness of between 1,500 and 3,000 cm²/gm.

23. A method of producing an expansive cement composition comprising:
   a. introducing argillaceous and calcareous reactant materials to the feed end of a kiln, said reactants containing sufficient materials selected from alkaline earth oxide and alkaline earth oxide forming materials to completely react with the argillaceous reactant materials in the kiln and to provide an excess of unreacted alkaline earth oxide in the burned clinker in the range of from about 1 to about 30 wt % thereof;
   b. burning said reactant materials in a burning zone in said kiln for a sufficient time and temperature to form the complete stoichiometric reaction product between said alkaline earth oxide and silica such that the maximum ratio of said alkaline earth oxide reacts with said silica to form said reaction product and whereby substantially none of a reaction product between said alkaline earth oxide and silica is formed having a lesser ratio of said alkaline earth oxide to said silica than said maximum, but yet yield from about 1 to about 30 wt % of free alkaline earth oxide in the resulting burned clinker; and
   c. grinding said clinker to produce a powdered hydraulic expansive cement composition.

24. The method of claim 23 wherein said alkaline earth oxide is selected from the group consisting of calcium oxide, barium oxide, strontium oxide and mixtures thereof.

25. The method of claim 24 wherein said clinker is ground to yield particles which are no larger than about 20 mesh (Tyler) and have a fineness of no greater than about 6,000 cm²/gm.

26. The method of claim 25 wherein said grinding produces particles which pass 80 mesh (Tyler) and having a fineness of no greater than 4,000 cm²/gm.

27. The method of claim 26 wherein said cement composition is ground to a fineness of between 1,500 and 3,000 cm²/gm.

28. A method of producing an expansive cement composition comprising:
   a. introducing argillaceous and calcareous reactant materials to the feed end of a kiln, said calcareous reactants containing sufficient CaO forming materials to completely react with the argillaceous reactant materials in the kiln and provide an excess of unreacted CaO in the burned clinker in the range of from about 10 to about 30 weight % thereof;
   b. burning said reactant materials in a burning zone in said kiln for a sufficient time and temperature to convert substantially all of the silicate in said feed to tricalcium silicate and yield substantially no dicalcium silicate, but yield from about 10 to about 30 weight % of free CaO in the resulting burned clinker; and
   c. grinding said clinker to produce a powdered hydraulic expansive cement composition.

* * * * *

UNITED STATES PATENT OFFICE
CERTIFICATE OF CORRECTION

Patent No. __3,884,710__   Dated __May 20, 1975__

Inventor(s) __Joseph H. Allen, Waldemar A. Klemm and John P. Luker__

It is certified that error appears in the above-identified patent and that said Letters Patent are hereby corrected as shown below:

Col. 1, line 66, "Type K" should be --"Type K"--.
Col. 4, line 54, "ststem" should be --system--;
  line 57, "Al₂O₃/Fe₂O₃" should be --$Al_2O_3/Fe_2O_3$--.
Col. 5, line 2, "deletrious" should be --deleterious--;
  line 6, "by" should be --be--.
Col. 9, line 35, "1 x 1 x 10" should be --1" x 1" x 10"--;
  line 67, "3 x 3 x 10" should be --3" x 3" x 10"--.
Col. 10, line 2, "type I" should be --Type I--;
  lines 46-67, "cement. Each" should be --cement. The cement portion of mix No. 7 consisted of the pure Type S cement. Each--;
  line 62, "3 x 3 x 10" should be --3" x 3" x 10"--.
Col. 11, line 36, "whichh" should be --which--.
Col. 12, line 42, "tricalcium and aluminate" should be --tricalcium aluminate--;
  line 48, (Table 8 heading) "COMPOISITION" should be --COMPOSITION--;
  line 68, "composition" should be --concentration.
Col. 14, line 9, "3 x 3 x 10" should be --3" x 3" x 10"--.
Col. 15, line 6, "3 x 3 x 10" should be --3" x 3" x 10"--;
  line 41, "wtih" should be --with--;
  line 43, "means" should be --mean--.
Col. 16, line 5 "sample" should be --samples--;
  line 35, "shown" should be --show--.
Col. 22, line 29 (Claim 12), "particular size no longer" should be --particle size no larger--;
  line 62 (Claim 19) "agrillaceous" should be --argillaceous--.
Col. 24, line 31 (Claim 28), "but yield" should be --but yet yield--.

Signed and Sealed this

*twelfth* Day of *August 1975*

[SEAL]

Attest:

RUTH C. MASON
*Attesting Officer*

C. MARSHALL DANN
*Commissioner of Patents and Trademarks*